(12) United States Patent
Kanzaki

(10) Patent No.: US 8,539,333 B2
(45) Date of Patent: Sep. 17, 2013

(54) TECHNIQUE FOR CHANGING THE DISPLAY OF WEB PAGES AS TIME PASSES

(75) Inventor: Eisuke Kanzaki, Fujisawa (JP)

(73) Assignee: International Business Machines Corporation, Armonk, NY (US)

( * ) Notice: Subject to any disclaimer, the term of this patent is extended or adjusted under 35 U.S.C. 154(b) by 1328 days.

(21) Appl. No.: 11/753,631

(22) Filed: May 25, 2007

(65) Prior Publication Data
US 2007/0277102 A1    Nov. 29, 2007

(30) Foreign Application Priority Data
May 25, 2006    (JP) .................. 2006-144827

(51) Int. Cl.
| G06F 17/00 | (2006.01) |
| G06F 17/20 | (2006.01) |
| G06F 17/21 | (2006.01) |
| G06F 17/22 | (2006.01) |
| G06F 17/24 | (2006.01) |
| G06F 17/25 | (2006.01) |
| G06F 17/26 | (2006.01) |
| G06F 17/27 | (2006.01) |
| G06F 17/28 | (2006.01) |

(52) U.S. Cl.
USPC .................. 715/210; 715/234; 715/273

(58) Field of Classification Search
USPC .. 715/206, 210, 273, 234, 744; 707/E17.116
See application file for complete search history.

(56) References Cited

U.S. PATENT DOCUMENTS

| 5,559,942 A * | 9/1996 | Gough et al. ................. 715/802 |
| 6,567,104 B1 * | 5/2003 | Andrew et al. ............... 715/762 |
| 6,754,648 B1 * | 6/2004 | Fittges et al. .......................... 1/1 |
| 7,559,034 B1 * | 7/2009 | Paperny et al. ............... 715/803 |
| 2002/0052888 A1 * | 5/2002 | Sellen et al. .................. 707/500 |
| 2004/0205480 A1 * | 10/2004 | Moore ....................... 715/500.1 |
| 2005/0076310 A1 * | 4/2005 | Tada ............................. 715/838 |
| 2005/0192924 A1 * | 9/2005 | Drucker et al. .................... 707/1 |
| 2006/0041554 A1 | 2/2006 | Svendsen et al. |
| 2007/0067309 A1 * | 3/2007 | Klein et al. ..................... 707/10 |
| 2007/0226641 A1 * | 9/2007 | Johnson et al. ............... 715/767 |

FOREIGN PATENT DOCUMENTS

| CN | 01822331 | 10/2001 |
| CN | 1488109 | 4/2004 |
| JP | 10-222415 | 8/1998 |
| JP | 11187341 | 7/1999 |
| JP | 2001331781 | 11/2001 |
| JP | 2002297114 | 10/2002 |
| JP | 2003-345826 | 12/2003 |
| JP | 2004110645 | 4/2004 |

(Continued)

*Primary Examiner* — Stephen Hong
*Assistant Examiner* — Nicholas Hasty
(74) *Attorney, Agent, or Firm* — Law Office of Jim Boice

(57) ABSTRACT

A display device for displaying a web page is provided, which displays each of the contents contained in a web page so that users can recognize whether the content is new or not. The display device has a displaying unit, an acquiring unit, and a changing unit. The displaying unit displays an image of each of the contents contained in the web page. The acquiring unit acquires a reference time point as a criterion of the age of each of the contents. The changing unit changes, for each of the contents, the image of the content displayed by the displaying unit to an image in which the age of the content is reflected in accordance with expiration of the reference time point.

19 Claims, 10 Drawing Sheets

(56) References Cited

FOREIGN PATENT DOCUMENTS

| JP | 2004206658 | 7/2004 |
|---|---|---|
| JP | 2005108066 | 4/2005 |
| JP | 2006079349 | 3/2006 |
| JP | 2006134056 | 5/2006 |

\* cited by examiner

FIG. 2

```
 1: <HTML><BODY>
 2: <TABLE><TBODY>
 3:
 4:     <TR>
 5:     <TD colspan=3 exp_date "2006/12/15" >
 6:         <STRONG>THIS PICTURE IS ·····</STRONG><BR>
 7:     </TD>
 8:     </TR>
 9:
10:     <TR>
11:     <TD exp_date "2006/3/15">
12:         <IMG SRC= "http://building.△△/···" >
13:     </TD>
14:     <TD exp_date "2006/3/15">
15:         <IMG SRC= "http://people.△△/···" >
16:     </TD>
17:     <TD exp_date "2006/3/15">
18:         <IMG SRC= "http://Road.△△/···" >
19:     </TD>
20:     </TR>
21:
22:     <TR>
23:     <TD colspan=3 exp_date "2006/3/17" >
24:         WORLD WEATHER FORECAST FOR TOMORROW (17th)····<BR></TD>
25:     </TR>
26:
27: </TBODY></TABLE>
28: </BODY></HTML>
```

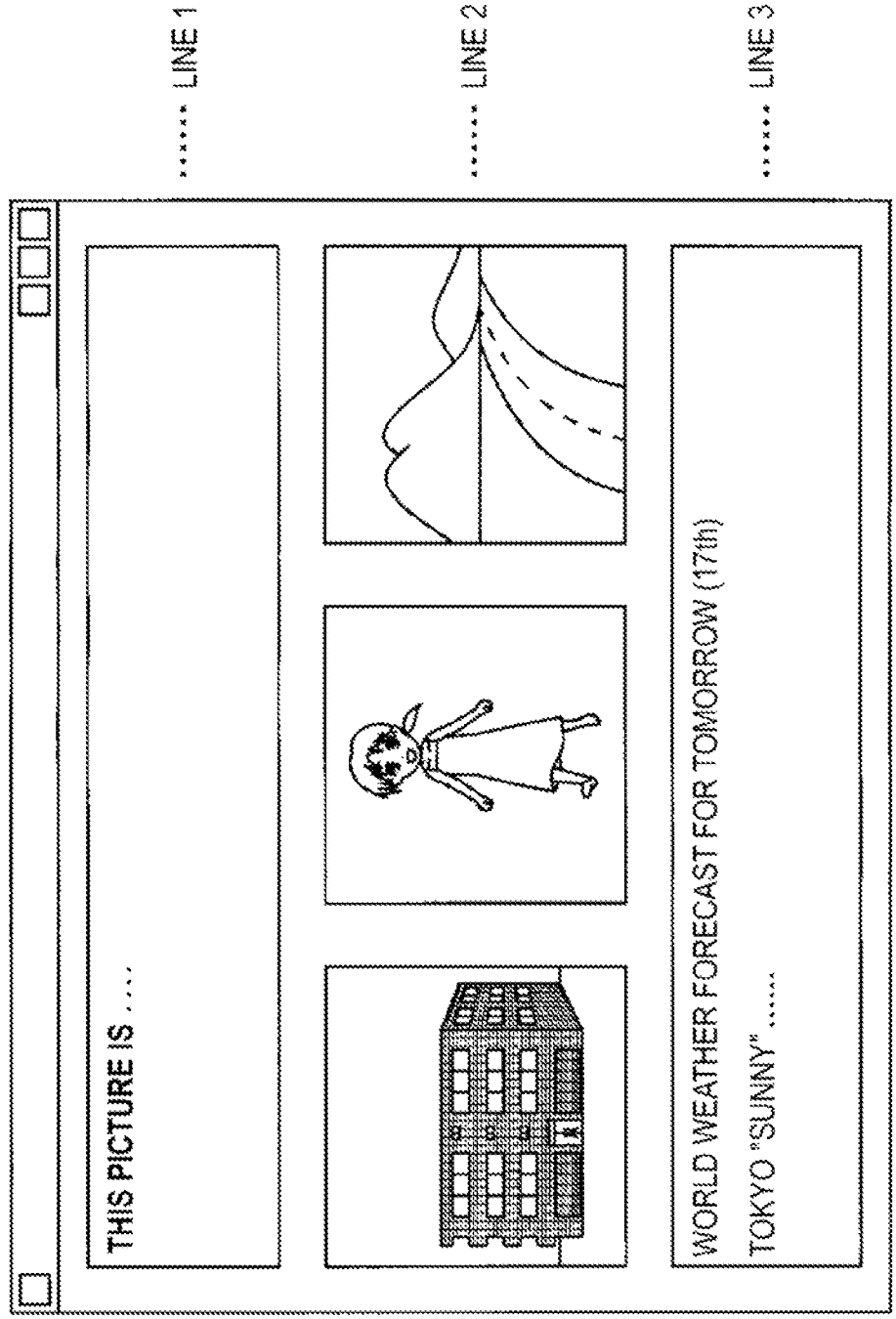

TECHNIQUE FOR CHANGING THE DISPLAY OF WEB PAGES AS TIME PASSES

CROSS REFERENCE TO RELATED APPLICATIONS

Pursuant to 35 U.S.C 119, Applicants claim the benefit of the earlier filing date of Japanese Patent Application No. 2006-144827, which was filed on May 25, 2006.

TECHNICAL FIELD

The present invention relates to techniques for displaying web pages. More specifically, the present invention relates to a technique for changing display of web pages as time passes.

BACKGROUND OF THE INVENTION

Recently, with widespread use of the Internet, a significant amount of content is made available to the public by web servers. In addition, web pages increasingly contain real time data, such as weather forecast data and stock price data. Such real time data is often useless unless the data is new. However, in many cases, it is difficult to retrieve new content from a significant amount of content. Conventionally, retrieval techniques, such as search engines, are used to retrieve the new content. Search engines can retrieve only web pages containing a keyword specified by users. Furthermore, a plurality of retrieved web pages is sorted by the last update date or the reference frequency, which can allow users to find a desired page more easily.

On the other hand, techniques allowing easier retrieval of information from web pages by functions provided in web browsers have been suggested. In Japanese Unexamined Patent Application Publication No. 10-222415 ("Yukihiko"), a browser displays a plurality of cross-linked web pages as data of a tree structure having a plurality of nodes. The browser displays a node for web pages that have been updated after a specific date more distinctly than the other node. Additionally, in Japanese Unexamined Patent Application Publication No. 2003-345826 ("Susumu"), a browser displays a list of contents in a web page in association with update date of the contents. According to these techniques, users can recognize an update history of the contents.

In search engines, web pages are employed as the unit of retrieval. For this reason, recently-updated web pages may be retrieved preferentially even if old content is included therein. In such a case, it is difficult to distinguish useful information from useless information in the web page. In addition, web pages that are frequently referred to may be retrieved and displayed preferentially even if the web pages have not been updated for a while. In this case, it becomes more difficult to retrieve new information.

Furthermore, in a technique described in Yukihiko, information is displayed in a tree structure that schematically showing a plurality of web pages, whereas, in a technique described in Susumu, a list of a plurality of web pages is displayed. Such a displaying fashion significantly differs from that of web pages displayed by general web browsers. Because of this, although this displaying fashion may be convenient for creation/management of web pages, the displaying fashion is unsuitable for enabling users to intuitively recognize whether or not each of contents contained in the web page is new. Moreover, depending on types of content, there is a case where content is useful even if the content is old. It is impossible to distinguish such useful content from old useless content.

SUMMARY OF THE INVENTION

The present invention provides a display device for displaying a web page. The display device includes a displaying unit for displaying an image of each of contents included in the web page, an acquiring unit for acquiring a reference time point used as a criterion of age of each of the contents, and a changing unit for changing, for each of the contents, the image of the content displayed by the displaying unit to an image in which the age of the content is reflected in accordance with expiration of the reference time point. The present invention allows users to intuitively recognize whether each of the contents contained in a web page is new or not.

In the above-mentioned summary of the invention, not all of the necessary features of the present invention are enumerated, and subcombinations of these features may also constitute the invention.

BRIEF DESCRIPTION OF THE DRAWINGS

FIG. 2 shows an example of a web page stored in a page database 25.

FIG. 3 shows a first display example of a web page displayed by a displaying unit 35.

DESCRIPTION OF THE PREFERRED EMBODIMENTS

Although the present invention will be described below through best mode for carrying out the invention (hereinafter, referred to as embodiments), the embodiments given below do not limit the present invention defined by the claims and not all of combinations of features described in the embodiments are indispensable to solving means of the present invention.

Figure 1:
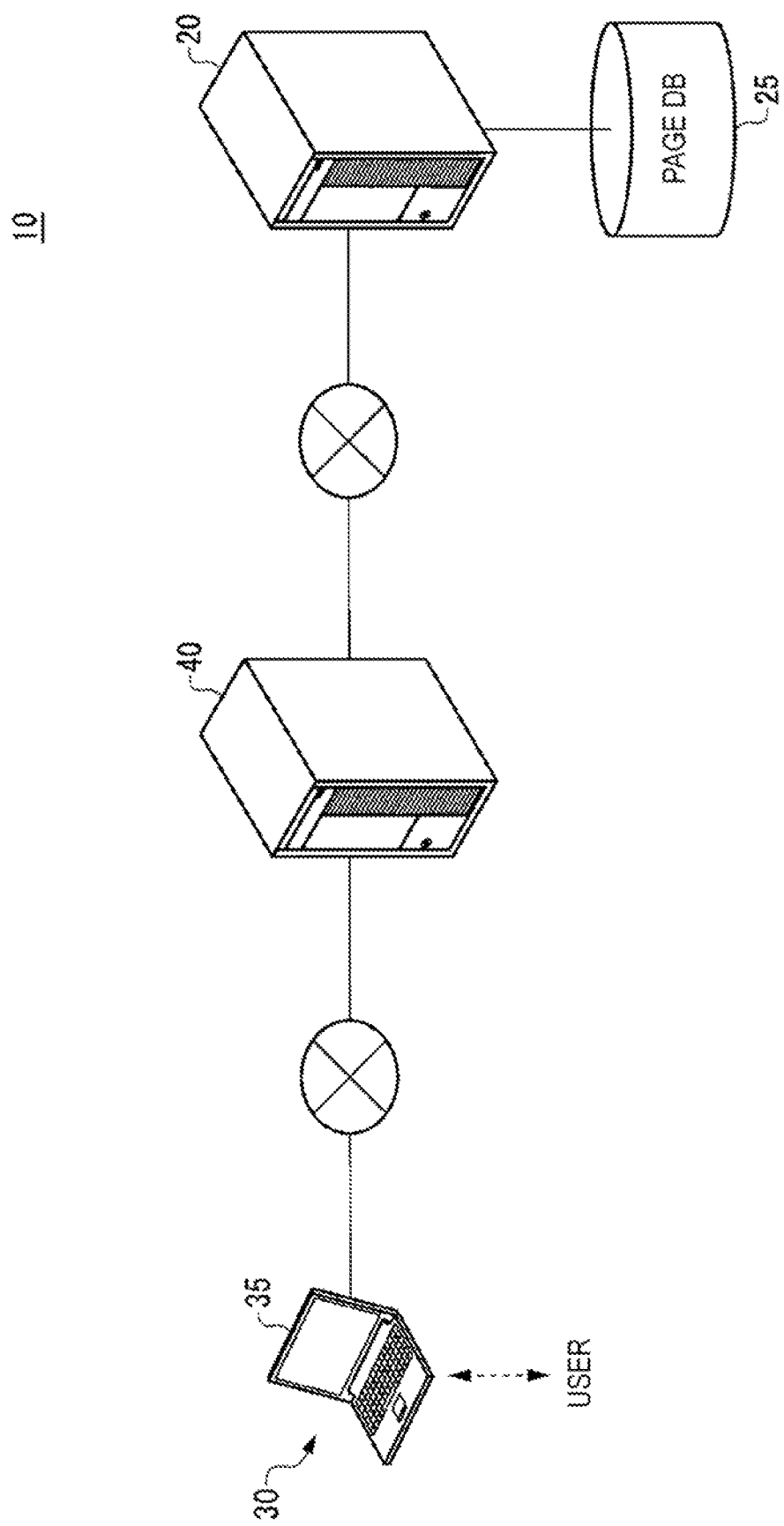
FIG. 1 shows an information processing system 10.

FIG. 1 shows an entire configuration of an information processing system 10. The information processing system 10 includes a web server 20, a display device 30, and a relay server 40. The web server 20 loads a web page requested by the display device 30 from a page database 25, and sends the loaded web page to the display device 30. The relay server 40 may be, for example, a proxy server or the like. The relay server 40 relays the web page to the display device 30. The display device 30 may be, for example, a personal computer, a PDA (personal digital assistant) or a mobile phone. The display device 30 requests the web server 20 to send a web page thereto in response to user operations. In addition the display device 30 displays the received web page to users using a displaying unit 35.

The display device 30 according to an embodiment is intended to allow users to intuitively recognize whether each of contents included in the received web page is new or not by performing, on each of the contents, image processing operations corresponding to an age of the contents. In addition, the relay server 40 according to an embodiment is intended to permit users to intuitively recognize whether each of contents is new or not by performing such image processing operations when the display device 30 does not perform the image processing operations.

FIG. 2 shows an example of a web page contained in the page database 25. This web page is a tagged text in which each of contents to be displayed is written in association with tags that indicate additional information of the contents. For example, web pages may be written in languages, such as HTML (hyper text markup language). More specifically, this web page includes five contents.

Firstly, this web page contains content 200 at the sixth line. The content 200 is a text saying "THIS PICTURE IS . . . ". The content 200 is written in association with tags 210. The tags 210 are those for specifying each element in a page that uses a table structure. These tags 210 cause the content 200 to be displayed at the first line of the page using the table structure. The tags 210 include a reference time point 220 used as a criterion of age of the content 200. For example, the tags 210 indicate that the content 200 at the sixth line is no longer new after Dec. 15, 2006.

In FIG. 2, the web page includes an expiration date of a period suitable for browsing the content. The expiration date corresponds to a reference time point used as a criterion of age of the content. Instead of the expiration date, the reference time point may be a combination of a creation date or a disclosure start date of the content and a length of a period suitable for browsing the content. In this case, the web page contains only the creation date or disclosure start date of the content and does not have to contain the length of the period. That is, the length of the period may be predetermined.

Secondly, at twelfth line, this web page contains a URL (uniform resource locator) 230 specifying the content to be displayed. The URL 230 specifies image data stored in a file on a web site "building.ΔΔ". When the URL 230 is written in association with an IMG tag, the image data specified by the URL 230 is displayed as content of this web page. Additionally, since the URL 230 is associated with the <TD> tags, the image data is displayed at the first column of the second line in the page using the table structure. The <TD> tags may contain a reference time point used as a criterion of age of this content.

Thirdly, at the 15th line, this web page contains another URL 230 specifying content to be displayed. The URL 230 specifies image data stored in a file on a web site "people.ΔΔ". If the URL 230 is written in association with the IMG tag, the image data is displayed as content of this web page. Furthermore, since the URL 230 is also associated with the <TD> tags, the image data is displayed at the second column of the second line in the page using the table structure.

Fourthly, at the 18th line, this web page contains still another URL 230 specifying content to be displayed. The URL 230 specifies image data stored in a file on a web site "Road.ΔΔ". Writing the URL 230 in association with the IMG tag causes the image data to be displayed as a content of this web page. Furthermore, the URL 230 is associated with the <TD> tags. Accordingly, the image data is displayed at the third column of the second line in the page using the table structure.

As shown in the second to fourth points, web pages may include URLs specifying contents, thereby containing the contents as a part of the pages. URLs may be written in association with frame tags or the like to specify other HTML documents as well as the IMG tag of HTML.

Fifthly, this web page contains another content 200 at the 24th line. The content 200 is a text that says "WORLD WEATHER FORECAST FOR TOMORROW (17th) . . . ". The content 200 is written in association with the tags 210. The tags 210 are those for specifying each element in a page using the table structure. These tags 210 cause the content 200 to be displayed at the third line of the page using the table structure. The tags 210 include a reference time point 220 used as a criterion of age of the content 200. For example, the tags 210 indicate that the content 200 at the 24th line is not new information anymore after Mar. 17, 2006.

FIG. 3 shows a first display example of a web page displayed by the displaying unit 35. The displaying unit 35 displays images shown in FIG. 3, when none of the reference time points of the contents of the illustrated web page have expired. More specifically, the displaying unit 35 displays an image for a text starting with "THIS PICTURE IS . . . " at the first line in the page using the table structure. This text is displayed by boldface. The displaying unit 35 also displays an image for the image data of a building, an image for the image data of a human figure, and an image for image data of scenery including a road at the second line in the page using the table structure. In addition, the displaying unit 35 displays an image for the world weather forecast text starting with "WORLD WEATHER FORECAST FOR TOMORROW (17th) . . . " at the third line in the page using the table structure.

Figure 4:
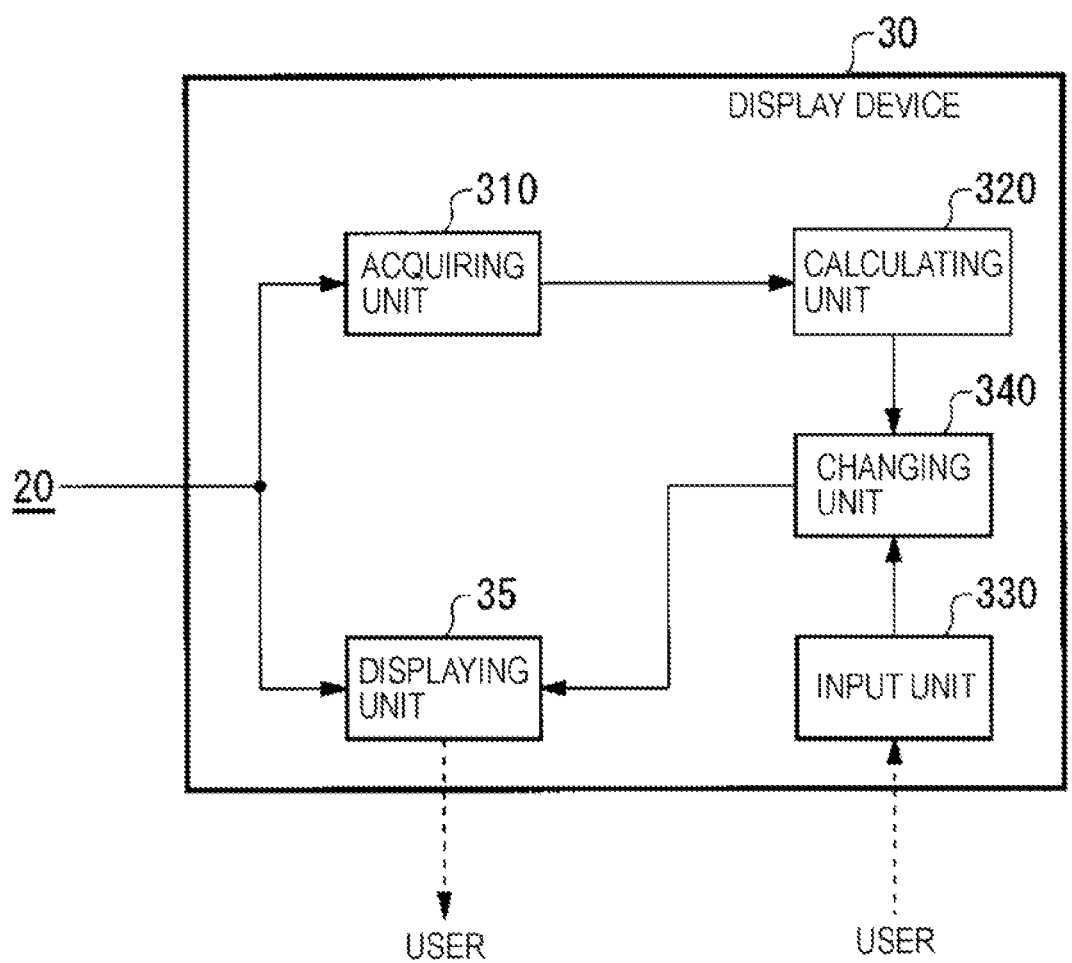
FIG. 4 shows a functional configuration of a display device 30.

FIG. 4 shows a functional configuration of the display device 30. The display device 30 includes the displaying unit 35, an acquiring unit 310, a calculating unit 320, an input unit 330, and a changing unit 340. The displaying unit 35 displays an image of each of contents contained in a web page acquired from the web server 20. The image of the content corresponds to an image to be displayed resulting from loading of the content, i.e., data, by a web browser. If the content is text data, an array of characters is displayed as an image, whereas, if the content is image data, a group of pixels based on the data is displayed as an image. The acquiring unit 310 acquires a reference time point used as a criterion of age of each of the contents from additional information written in association with each of the contents in the web page. For example, the acquiring unit 310 acquires a reference time point "Dec. 15, 2006" written in association with the text "THIS PICTURE IS . . . " illustrated at the sixth line in FIG. 2.

The calculating unit 320 calculates, for each of the contents, an age of the content on the basis of a difference between a present time point and a reference time point. The present time point may be a time point at which the age is calculated by the calculating unit 320. For example, in a case where the calculation time point is Jan. 1, 2007 and the reference time point is Dec. 15, 2006, the calculating unit 320 calculates the age of the content on the basis of the difference therebetween, i.e., 17 days. The age becomes greater in proportion to the difference.

The input unit 330 receives an input specifying a degree that the age of the content is reflected on the image of the content the reference time point set for which has expired. The changing unit 340 changes, for each of the contents an image of the content displayed by the displaying unit 35 to an image in which the age of the content is reflected in accordance with expiration of the reference time point. More specifically, the changing unit 340 changes the image of each of the contents on the basis of the age calculated for the content and the specified degree of reflection. To reflect the age on the image, the changing unit 340 may combine a predetermined image with the image of the content or employ a predetermined filter on the image to apply a visual effect on the image. The predetermined image may be, for example, an image of a cobweb or an image showing a gap in a torn paper. The filter may be, for example, that for mixing sepia or gray in color with each pixel value of the image.

Figure 5:
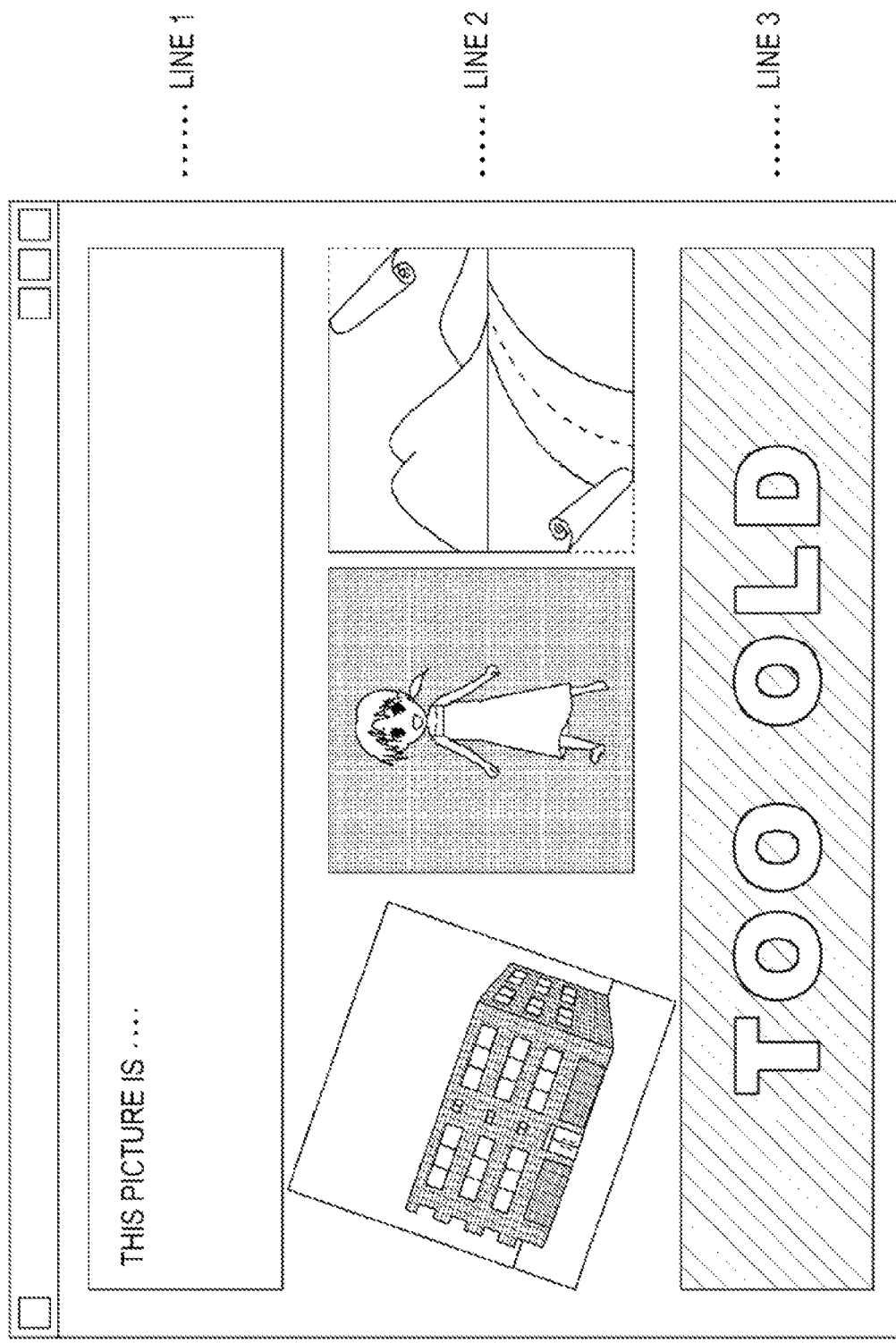
FIG. 5 shows a second display example of a web page displayed by a displaying unit 35.

FIG. 5 shows a second display example of a web page displayed by the displaying unit 35. The changing unit 340 changes the image of each of the contents displayed by the displaying unit 35 to an image in which the age of the content is reflected if all of the reference time points of the contents contained in the web page illustrated in FIG. 2 have expired. The changing unit 340 may change the image of the content having the expired reference time point to an image in which the age of the content is reflected by a mode corresponding to the type of the content. That is, for example, the changing unit 340 changes an image of first content including a text to an image in which the age of the content is reflected by a first mode, whereas the changing unit 340 changes an image of second content including image data to an image in which the age of the content is reflected by a second mode different from the first one.

More specifically, at the first line in the page using the table structure, the changing unit 340 changes the image of the content to the image in which the age of the content is reflected by narrowing line widths of characters included in the text if the content having the expired reference time point includes the text. On the other hand, at the first column of the second line in the page using the table structure, the changing unit 340 changes the image of the content to the image in which the age of the content is reflected by displaying the image of the content obliquely if the content having the expired reference time point includes image data.

Furthermore, the changing unit 340 may identify a display target included in the content having the expired reference time point by image recognition and change the image of the content by different modes in accordance with the identified display target, when the content includes image data. For example, since a building is recognized as the display target in the image of the content at the first column of the second line, the changing unit 340 changes the image of the content by a mode for buildings (e.g., a mode of tilting the image of the content). On the other hand, since a human figure is recognized as the display target in the image of the content at the second column of the second line, the changing unit 340 employs a filter that mixes sepia in color with the color of a given image on the image of the content. As an example, the changing unit 340 may calculate a weighted mean of each brightness value of R (red), G (green), or B (blue) and the corresponding brightness value of sepia to be mixed for each pixel, and may employ the calculated values as brightness values of the pixels in the combined image. Desirably, the weight of the brightness of sepia to that of the original pixel increases as the age increases.

Furthermore, since neither a human figure nor a building is recognized as the display target in the image of content at the third column of the second line, the changing unit 340 may combine a predetermined image showing a curled old paper with the image of the content. Preferably, the changing unit 340 may alter a combination ratio of the predetermined image to the image of the content having the expired reference time point in accordance with the age calculated for the content. More specifically, the combination ratio of the predetermined image to the original image may increase as the age increases, and may decrease as the age decreases, for example. That is, for example, the image showing the curled paper can be seen more clearly as the age goes up.

In addition to the above examples, there may be different variations regarding modes for reflecting the age on the image. For example, the changing unit 340 may lower contrast of values of pixels in the image as the age becomes higher. In addition, the changing unit 340 may mix gray in color with the color of the image using an average of each brightness value of RGB as the brightness of each pixel. Additionally, the changing unit 340 may lower a value of color of the image as the age goes up. Furthermore, the changing unit 340 may employ a filter for applying visual effects, such as a blur effect and a grain effect, on the image. Moreover, regarding the content including the text, the changing unit 340 may reflect the age on the image of the content by setting a background color of the text more similar to the color of the text. Additionally, the changing unit 340 may change display positions or tilt angles of characters included in the text for each character. This gives users an impression that the character array is untidy and enables the users to intuitively recognize that the content is old.

In addition, the changing unit 340 may retrieve a predetermined keyword from the content having the expired reference time point when the content includes a text, and change the image of the content in a mode different from that used when the keyword is not retrieved from the content if the keyword is retrieved from the content. For example, the text at the third line in the page using the table structure contains a predetermined keyword (weather), while the text at the first line in the page using the table structure does not contain this keyword. Accordingly, the changing unit 340 changes the image of the text at the third line in a mode different from that for the text at the first line. For example, the changing unit 340 may combine a black image saying "TOO OLD" with the image of the text at the third line. The keywords may be predetermined by users as those relating to real time information.

Figure 6:
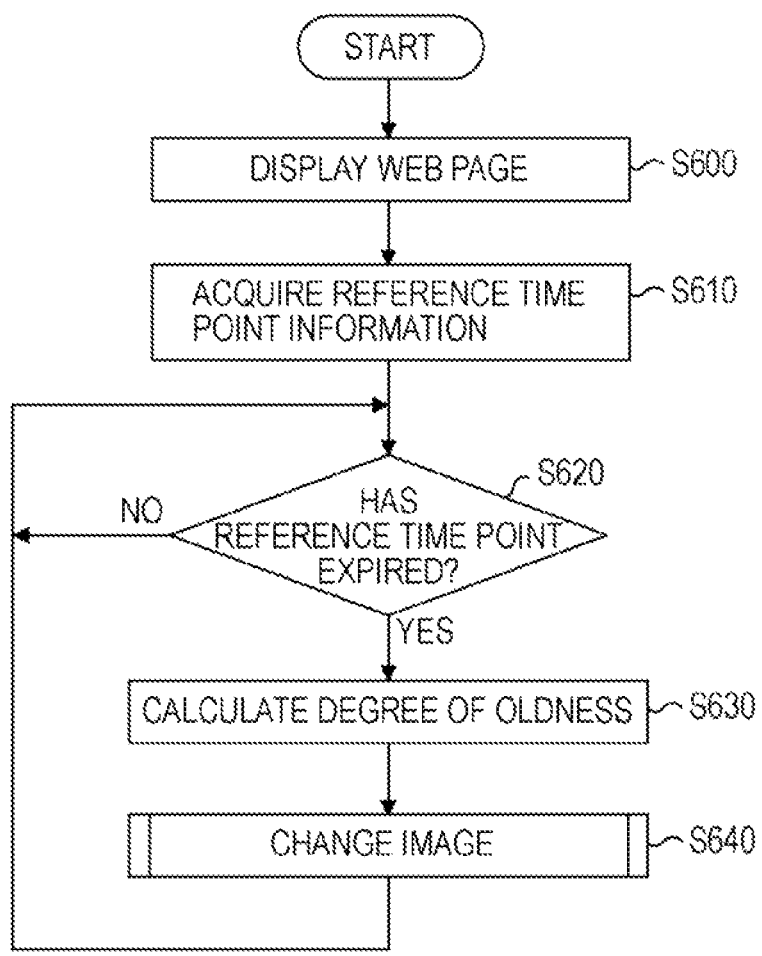
FIG. 6 shows a flowchart of a process for changing display of a web page.

FIG. 6 shows a flowchart of a process for changing display of a web page. The displaying unit 35 displays an image of each of the contents included in the web page (S600). The acquiring unit 310 acquires the reference time point used as a criterion of age of each of the contents (S610). The calculating unit 320 determines, for each of the contents, whether the reference time point of the content has already expired on the basis of a difference between the present time point and the reference time point (S620). If the reference time point has expired (S620:YES) the calculating unit 320 calculates the age of the content (S630). The changing unit 340 changes the image of the content displayed by the displaying unit 35 to an image in which the age of the content is reflected on the basis of the age of the content (S640).

There are some variations as methods for reflecting the age of content on the image of the content. For example, the changing unit 340 analyses an HTML document constructing the web page, thereby acquiring a display position of each of the contents. To reflect the age on an image of the content, the changing unit 340 then may superimpose and display a mask image for reflecting the age at the same display position of the image of the content. Alternatively, the changing unit 340 may combine the image of the content with the mask image for reflecting the age to generate an image beforehand, may create a rendering command for displaying the image, and may output the rendering command to a rendering engine. In addition, the changing unit 340 may change the image of the content by making changes for reflecting the age of each of the contents in the acquired HTML document.

Figure 7:
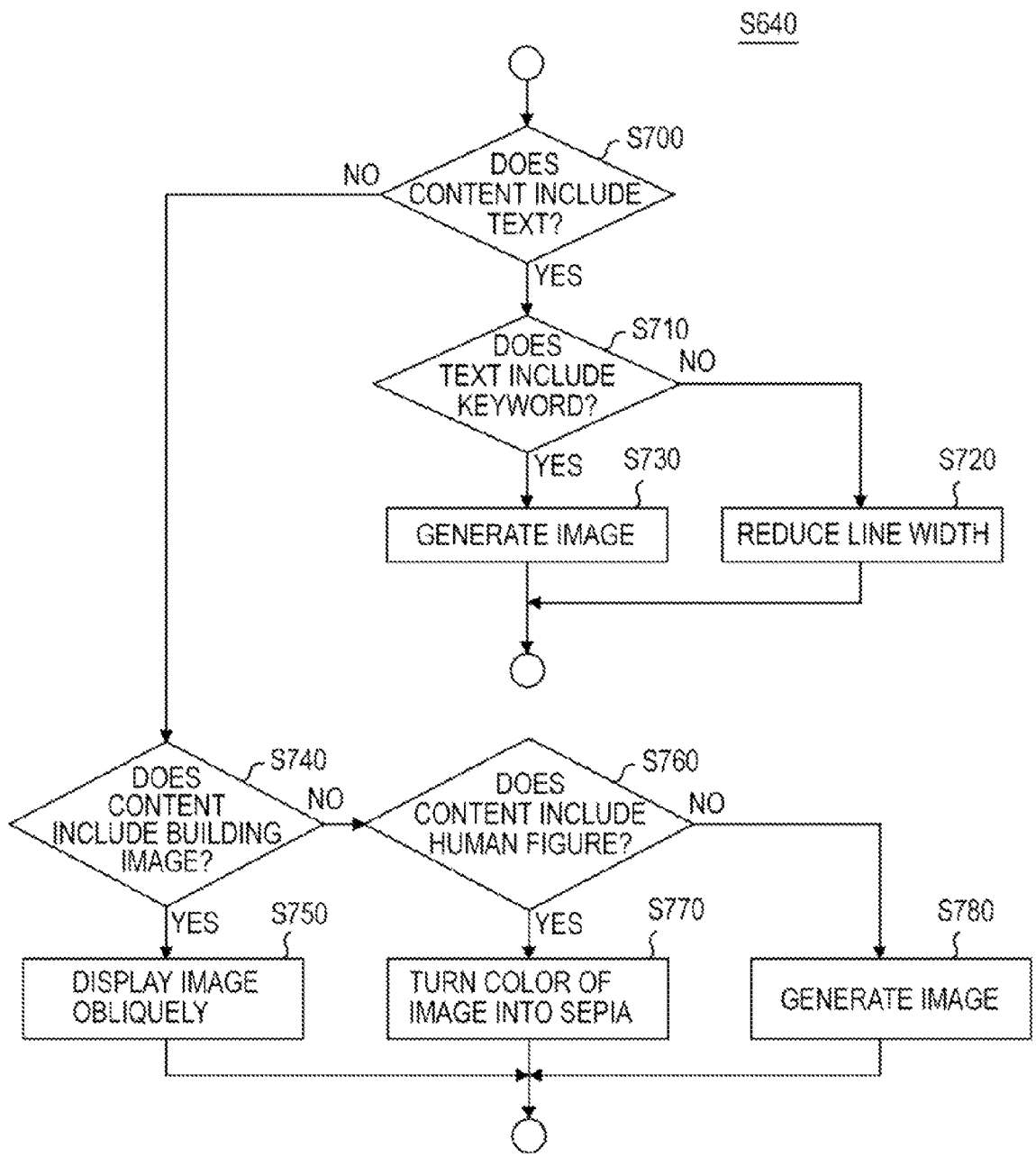
FIG. 7 shows a detailed example of processing performed at S640.

FIG. 7 shows a detailed example of processing performed at S640. Referring to FIG. 7, an example processing operation performed when the changing unit 340 changes images by different modes depending on types of images and other conditions. It is assumed that each of the contents contains either image data or text data. Firstly, the changing unit 340 determines whether content having expired reference time point includes a text or not (S700). If the content includes the text (S700:YES), the changing unit 340 determines whether the text includes a predetermined keyword or not (S710). If the text does not include the predetermined keyword (S710: NO), the changing unit 340 narrows line widths of characters included in the text (S720). On the other hand, if the text includes the keyword (S710:YES), the changing unit 340 combines a black image saying "TOO OLD" with the image of the content (S730).

A degree of reflecting age of the content may differ depending on a degree specified by users. For example, when a highest degree of reflection is specified for content, the changing unit 340 displays a black image instead of the image of the content if the reference time point has expired. That is, the combination ratio is set at 0 to 1. On the other hand, when a lowest degree of reflection is specified for the content, the changing unit 340 displays the image of the original content without change even if the reference time point has expired. When the degree of reflection is set at a value between the lowest and the highest, the changing unit 340 gradually increases the combination ratio of the black image in accordance with the age.

If the content does not include the text (S700:NO), the changing unit 340 identifies a display target in the image data contained in the content by image recognition, thereby determining whether a display target includes a building (S740). On the condition that the display target includes a building (S740:YES), the changing unit 340 changes the image of the content displayed by the displaying unit 35 to a tilted image of the content (S750). On the condition that the display target does not include a building (S740:NO), the changing unit 340 then determines whether or not the display target includes a human figure (S760).

On the condition that the display target includes a human figure (S760:YES), the changing unit 340 employs a filter for mixing sepia in color with the color of a given image on the image of the content (S770). On the condition that the display target includes neither a building nor a human figure (S760: NO), the changing unit 340 combines an image of a sheet of old paper whose corners are curled with the image of the content and displays the combined image (S780).

The determination conditions shown in FIG. 7 are only examples, and criteria for determining whether to change images are not limited to the above-given examples. For example, instead of the above-described processing, the changing unit 340 may change the image of the content having the expired reference time point to an image in which the age of the content is reflected in different modes depending on URLs specifying the content. For example, referring to FIG. 2, the URL specifying the content shown at the first column of the second line in FIG. 5 includes "building". Accordingly, the changing unit 340 may change the image in a mode predetermined for images of buildings. In addition, the changing unit 340 may employ only site names contained in the URL as a criterion of changing images or only file names or file extensions contained in the URL as the criterion of changing images.

As described above with reference to FIGS. 1 to 7, the display device 30 according to the embodiment can change display of web pages acquired from the web server 20 in accordance with the age of each of the contents. Since the display is changed for each of the contents, users can intuitively recognize new contents even if various contents coexist in the page. In addition, since the display device 30 changes the image in a suitable mode depending on the types of images and other conditions, the users can appropriately recognize the age of each image.

In the following, functions and operations of the relay server 40 will be described with reference to FIGS. 8 and 9. The relay server 40 is intended to change an image of each of contents contained in a web page to be transferred. This allows the image of each of the contents to be changed to an image reflecting the age of the content even in a case where the display device 30 does not change the image of the content.

Figure 8:
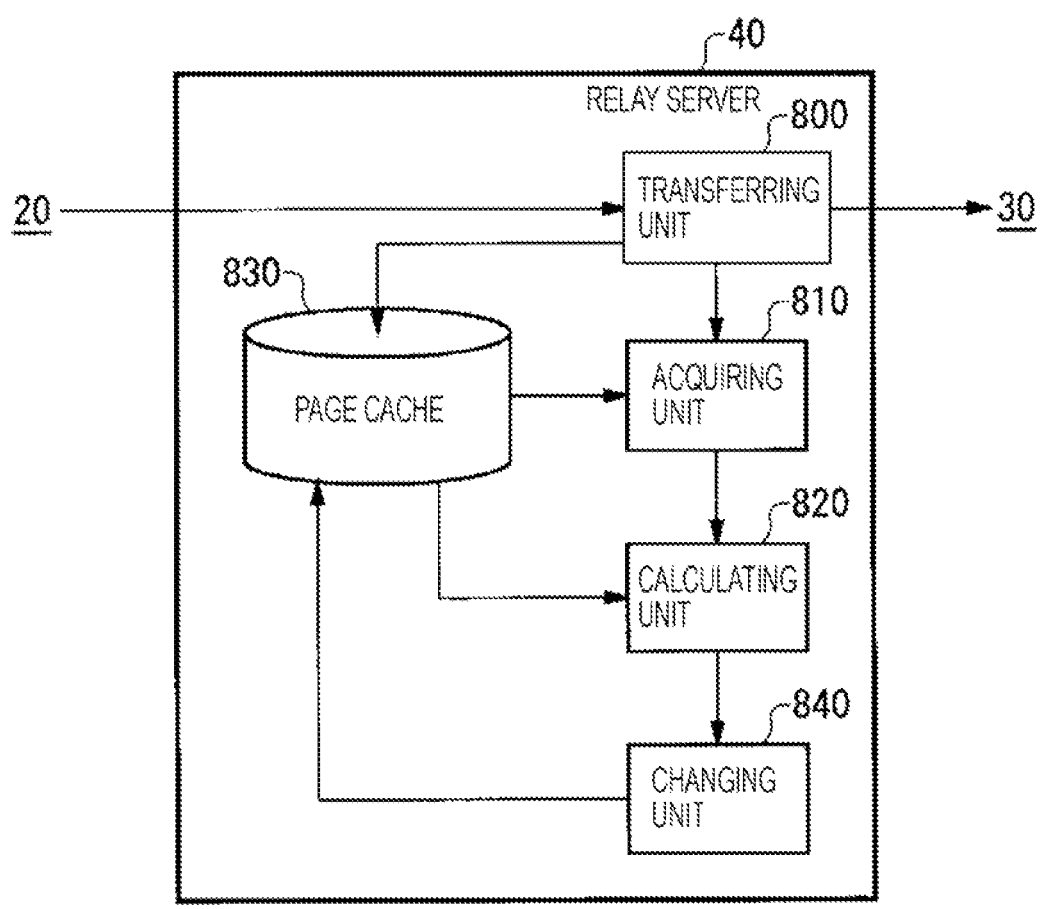
FIG. 8 shows a functional configuration of a relay server 40.

FIG. 8 shows a functional configuration of the relay server 40. The relay server 40 has a transferring unit 800, an acquiring unit 810, a calculating unit 820, a page cache 830, and a changing unit 840. The transferring unit 800 transfers a web page acquired from the web server 20 to the display device 30. In addition, the transferring unit 800 stores the web page in the page cache 830 to prepare for a next request. The acquiring unit 810 acquires a reference time point used as a criterion of age of each of contents contained in the web page. The calculating unit 820 calculates an age of the content on the basis of a difference between the present time point and the reference time point for each of the contents. The reference time point may be acquired from tags associated with the content as illustrated in FIG. 2. The calculating unit 820 may calculate a difference between the reference time point and a time point at which the calculation is performed, and use the difference as the age of the content.

Alternatively, the acquiring unit 810 may store a time point, at which each web page is updated in the page cache 830, in the page cache 830, and employs a predetermined period from that time point as the reference time point. In this case, the calculating unit 820 may calculate the age of the content by subtracting the predetermined period from a period of time that has elapsed without update since each web page is updated last time in the page cache 830. The changing unit 840 changes, for each of the contents, the image of the content stored in the page cache 830 to an image in which age of the content is reflected in accordance with expiration of the reference time point. By this configuration, it is possible to change the image of the content to be transferred to the display device 30 thereafter.

Figure 9:
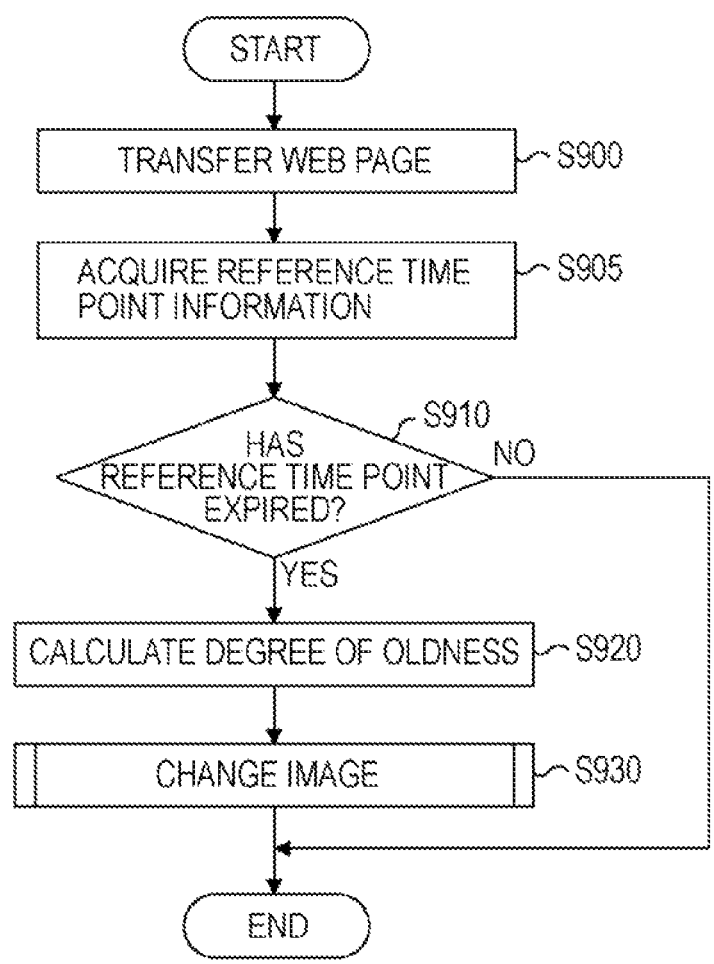
FIG. 9 shows a flowchart of a process for changing a web page to be transferred.

FIG. 9 shows a flowchart of a process for changing a web page to be transferred. The transferring unit 800 transfers a web page acquired from the web server 20 to the display device 30 (S900). The acquiring unit 810 acquires the reference time point used as a criterion of age of each of the contents contained in the web page to be transferred (S905). The calculating unit 820 determines whether or not the reference time point for each of the contents has expired (S910). If the reference time point has expired (S910:YES) the calculating unit 820 calculates, for each of the contents, the age of the content on the basis of the difference between the present time point and the reference time point (S920). The changing unit 840 then changes the image of the content having the expired reference time point to an image in which the age of the content is reflected (S930).

As described above with reference to FIGS. 8 and 9, even when the display device 30 does not have a function to change images, it is possible to reflect the age on each image of the contents by implementing the function in the relay server 40. Since existing equipments can be used regarding the display device 30 and the web server 20 by this configuration, the cost and time for introducing the function according to the embodiment can be reduced by newly installing only the relay server 40. Furthermore, the cost and time for introducing the function according to the embodiment can be further reduced by implementing the function of changing images in the existing relay server 40 instead of newly installing the relay server 40.

Figure 10:
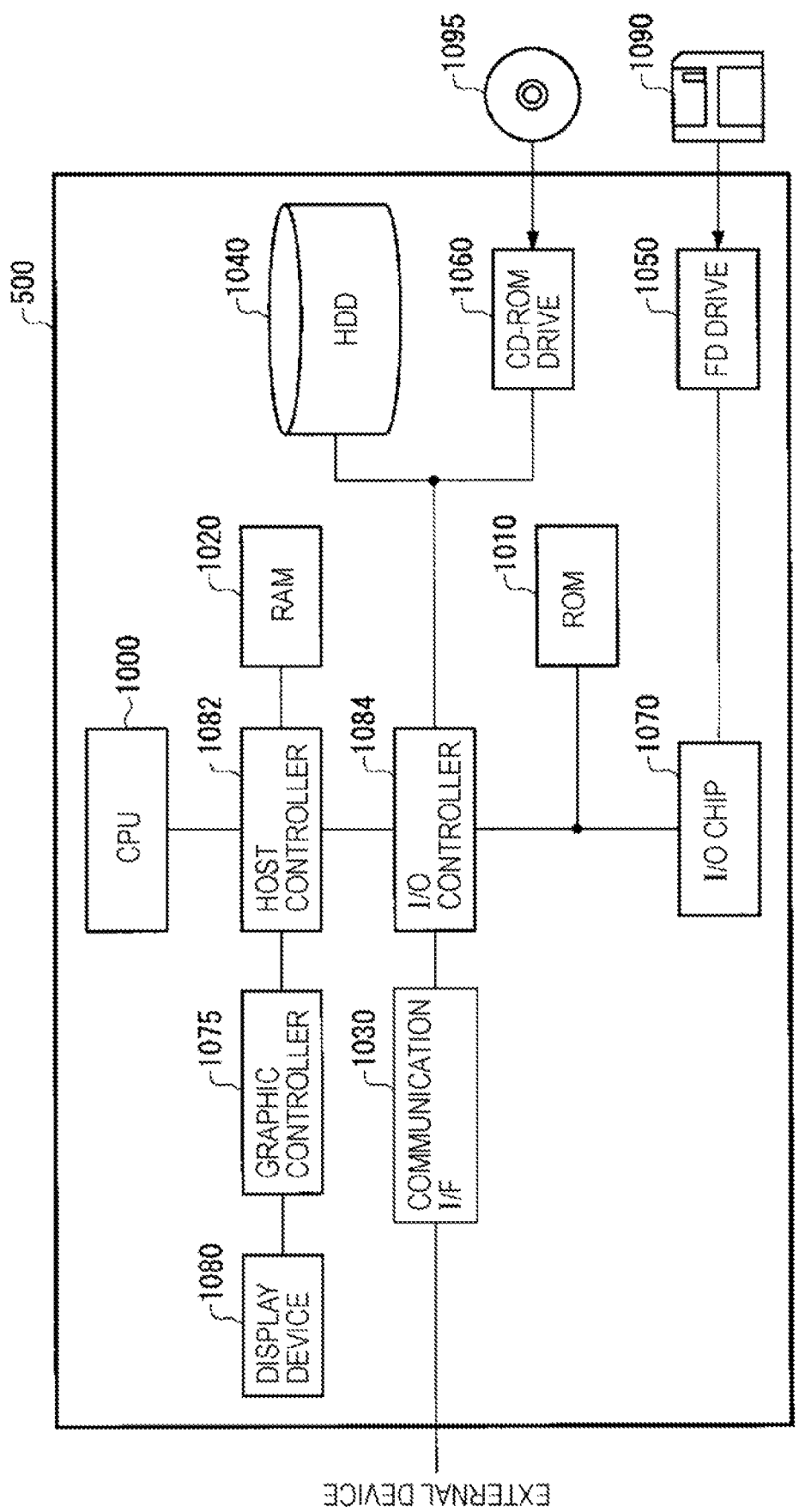
FIG. 10 shows an example of a hardware configuration of an image processing apparatus 500 that functions as a display device 30 or a relay server 40.

FIG. 10 shows an example of a hardware configuration of an information processing apparatus 500 that functions as the display device 30 or the relay server 40. The information processing apparatus 500 has a CPU (central processing unit) peripheral section, an input/output (I/O) section, and a legacy I/O section. The CPU peripheral section has a CPU 1000, a RAM (random access memory) 1020, and a graphic controller 1075, which are connected with each other by a host controller 1082. The I/O section includes a communication interface 1030, a hard disk drive (HDD) 1040, and a CD-ROM (compact disc-read only memory) drive 1060, which are connected to the host controller 1082 by an I/O controller 1084. The legacy I/O section includes a ROM 1010, a flexible disk drive (FD drive) 1050, and an I/O chip 1070, which are connected to the I/O controller 1084.

The CPU 1000 and the graphic controller 1075 access the RAM 1020 at a high transfer rate. The host controller 1082 interconnects the RAM 1020, the CPU 1000, and the graphic controller 1075. The CPU 1000 works based on programs stored in the ROM 1010 and the RAM 1020, and controls each part. The graphic controller 1075 acquires image data generated by the CPU 1000 or the like in a frame buffer provided in the RAM 1020, and causes a display device 1080 to display images corresponding to the image data thereon. Instead of this configuration, the graphic controller 1075 may include a frame buffer for storing image data generated by the CPU 1000 or the like therein.

The I/O controller 1084 interconnects the host controller 1082 and relatively high-speed I/O devices, such as the communication interface 1030, the HDD 1040, and the CD-ROM drive 1060. The communication interface 1030 communicates with external devices via a network. The HDD 1040 stores programs and data used by the information processing apparatus 500. The CD-ROM drive 1060 reads programs or data from a CD-ROM 1095, and supplies the programs or data to the RAM 1020 or the HDD 1040.

The ROM 1010 and relatively low-speed I/O devices, such as the FD drive 1050 and the I/O chip 1070, are connected to the I/O controller 1084. The ROM 1010 stores a boot program executed by the CPU 1000 at the time of booting of the information processing apparatus 500 and programs that are dependent on the hardware of the information processing apparatus 500. The FD drive 1050 reads programs or data from a flexible disk 1090, and supplies the programs or data to the RAM 1020 or the HDD 1040 through the I/O chip 1070. The I/O chip 1070 is connected to the flexible disk 1090 and various input/output devices through, for example, a parallel port, a serial port, a keyboard port, or a mouse port, etc.

Programs are stored on a recording medium such as the flexible disk 1090, the CD-ROM 1095, or an IC (integrated circuit) card, and supplied to the information processing apparatus 500 by users. The programs are read out from the recording medium through the I/O chip 1070 and/or the I/O controller 1084, and installed and executed in the information processing apparatus 500. Since operations that the programs cause the information processing apparatus 500 or the like to execute are the same as those performed by the display device 30 or the relay server 40 described with reference to FIGS. 1 to 9, description thereof is omitted.

The programs described above may be stored on external recording media. The recording media may be not only the flexible disk 1090 or the CD-ROM 1095 but also an optical recording medium such as DVD (digital versatile disk) or a PD (phase change rewritable disk), a magneto-optical recording medium such as an MD (minidisc), a tape medium, and a semiconductor memory such as an IC card. In addition, the programs may be supplied to the information processing apparatus 500 via a network using a storage device, such as an HDD or a RAM, provided in a server system connected to a private communication network or the Internet as the recording medium.

While the present invention has been described using the embodiments of the present invention, the technical scope of the present invention is not limited to the scope described in the above embodiments. It is obvious for those skilled in the art that various modifications or improvements can be added to the above-described embodiments. It is also obvious from the appended claims that such modifications or improvements can be also included within the technical scope of the present invention.

The invention claimed is:

1. A display device for displaying a web page, comprising:
a displaying unit for displaying an image of each of multiple contents included in the web page, wherein the displaying unit is a hardware display device;
an acquiring unit for acquiring a reference time point used as a criterion of an age of each of the multiple contents;
a changing unit for analyzing a content of each of the multiple contents to determine a subject of the image of each of the multiple contents included in the web page; and
the changing unit changing, for each of the multiple contents, the image of the subject displayed by the displaying unit by overlaying a second image over the image of the subject in response to an expiration of the reference time point for the content displayed by the displaying unit, wherein, in response to the changing unit determining that the content does not include text:
determining what type of subject is displayed on the web page; and
selectively adjusting a rendering of a visual image of the subject according to an age of the visual image and according to the type of subject being displayed on the web page
in response to determining that the visual image is of a building and that the visual image of the building is older than a predetermined value, tilting the visual image of the building when displayed on the hardware display device.

2. The display device according to claim 1, further comprising:
a calculating unit for calculating, for each of the multiple contents, an age of the content based on a difference between a present time point and the reference time point, and wherein
the changing unit changes the image of each of the multiple contents to an image in which the age calculated for the content is reflected.

3. The display device according to claim 2, wherein
the web page is defined as a tagged text in which content to be displayed is written in association with tags that indicate additional information of the content, and wherein
the acquiring unit acquires the reference time point used as the criterion of age of the content from the additional information written in association with each of the multiple contents in the web page.

4. The display device according to claim 2, wherein the changing unit changes the image of the content having the expired reference time point to an image in which the age of the content is reflected by employing a predetermined filter on the image of the content to apply a visual effect on the image.

5. A computer implemented method of modifying a content on a web page according to an age of the content on the web page, the computer implemented method comprising:
- displaying an image of the content on the web page;
- acquiring a reference time point used as a criterion of the age of the content;
- determining if the content includes text that is displayed on the web page;
- in response to determining that the content includes text that is displayed on the web page, determining if the text includes a predetermined keyword;
- in response to determining that the text includes the predetermined keyword, displaying a message on the web page, indicating that the content has exceeded a predetermined reference time point, while continuing to display the content on the web page; and
- in response to determining that the text does not include the predetermined keyword, changing a line width of characters in the text that is displayed on the web page.

6. The computer implemented method of claim 5, further comprising:
- in response to determining that the content does not include text, determining what type of visual image displays the content on the web page; and
- selectively adjusting a rendering of the visual image according the type of visual image being displayed on the web page.

7. The computer implemented method of claim 6, wherein: the web page is defined as a tagged text in which content to be displayed is written in association with tags that indicate additional information of the content.

8. The computer implemented method of claim 6, wherein: the image of the content having the expired reference time point changes to an image in which the age of the content is reflected by combining a predetermined image with the image of the content.

9. The computer implemented method of claim 6, wherein: the image of the content having the expired reference time point changes to an image in which the age of the content is reflected by employing a predetermined filter on the image of the content to apply a visual effect on the image.

10. The computer implemented method of claim 6, wherein:
- on the condition that the content having the expired reference time point includes text, the image of the content changes to an image in which the age of the content is reflected by narrowing line widths of characters included in the text.

11. The computer implemented method of claim 6, wherein:
- the image of the content having the expired reference time point changes to an image in which the age of the content is reflected by a mode corresponding to the type of the content.

12. A non-transitory computer-usable recording medium embodying computer program code, the computer program code comprising computer executable instructions configured for:
- displaying an image of a content on a web page;
- acquiring a reference time point used as a criterion of an age of the content;
- in response to determining that the content does not include text, determining what type of visual image displays the content on the web page; and
- selectively adjusting a rendering of the visual image according to an age of the visual image and according to the type of visual image being displayed on the web page;
- calculating, for each of multiple contents on the web page, the age of the content based on difference between a present time point and the reference time point;
- in response to determining that a first content displayed on the web page is a depiction of a building, tilting the depiction of the building to indicate that an age of the first content has passed the reference time point;
- in response to determining that a second content displayed on the web page is a depiction of a person, changing a coloring of the depiction of the person to indicate that an age of the second content has passed the reference time point; and
- in response to determining that a third content displayed on the web page is a depiction of a scene that is neither a building nor a person, overlaying a second image over the depiction of the scene that is neither the building nor the person to indicate that an age of the third content has passed the reference time point.

13. The non-transitory computer-usable recording medium of claim 12, wherein:
- the web page is defined as a tagged text in which content to be displayed is written in association with tags that indicate additional information of the content, and
- wherein the reference time point used as the criterion of age of the content from the information written in association with each of the multiple contents in the web page.

14. The non-transitory computer-usable recording medium of claim 12, further comprising:
- calculating, for each of the multiple contents, an age of the content based on a difference between a present time point and the reference time point; and
- changing the image of the content having the expired reference time point to an image in which the age of the content is reflected by combining a predetermined image with the image of the content.

15. The non-transitory computer-usable recording medium of claim 12, wherein:
- the image of the content having the expired reference time point changes to an image in which the age of the content is reflected by employing a predetermined filter on the image of the content to apply a visual effect on the image.

16. The non-transitory computer-usable recording medium of claim 12, wherein:
- on the condition that the content having the expired reference time point includes text, the image of the content changes to an image in which the age of the content is reflected by narrowing line widths of characters included in the text.

17. The computer implemented method of claim 5, further comprising:
- in response to determining that the visual image is older than a predetermined age, displaying the visual image over a depiction of a paper with curled edges; and
- increasing an amount of curling on the curled edges as the visual image gets older.

18. The computer implemented method of claim 5, further comprising:
- in response to determining that the visual image is of a person, darkening and decolorizing the visual image of the person displayed on the hardware display device such that the visual image becomes darker and more monochromatic as an age of the visual image increases.

19. The computer implemented method of claim 5, further comprising:
   in response to determining that the visual image is of a building and that the visual image of the building is older than a predetermined value, tilting the visual image of the building when displayed on the hardware display device.

* * * * *